2 Sheets—Sheet 1.

W. H. JOHNSON.

MILK-COOLER.

No. 7,110. Reissued May 16, 1876.

Witnesses:
Donn Turtchell
Will H. Dodge

Inventor:
W. H. Johnson
by Dodge & Son
his Attys

N. PETERS, PHOTO-LITHOGRAPHER, WASHINGTON, D. C.

2 Sheets—Sheet 2.

W. H. JOHNSON.

MILK-COOLER.

No. 7,110.

Reissued May 16, 1876.

Witnesses:

Donn Twitchell.

Will. H. Dodge.

Inventor:

W. H. Johnson.

by Dodge & Son his Attys

N. PETERS, PHOTO-LITHOGRAPHER, WASHINGTON, D. C.

UNITED STATES PATENT OFFICE.

WILLIAM H. JOHNSON, OF DELHI, NEW YORK, ASSIGNOR OF ONE-HALF INTEREST TO H. A. PITCHER AND F. A. RAY, OF SAME PLACE.

IMPROVEMENT IN MILK-COOLERS.

Specification forming part of Letters Patent No. 165,102, dated June 29, 1875; reissue No. 7,110, dated May 16, 1876; application filed January 4, 1876.

*To all whom it may concern:*

Be it known that I, WILLIAM H. JOHNSON, of Delhi, in the county of Delaware and State of New York, have invented certain new and useful Improvements in Milk-Coolers; and I do hereby declare that the following is a full, clear, and exact description thereof, reference being had to the accompanying drawings, making part of this specification, and to the letters of reference marked thereon—like letters indicating like parts wherever they occur.

To enable others skilled in the art to construct and use my invention, I will proceed to describe it.

My invention consists in certain improvements in the apparatus known as milk-coolers, of that class now used in factories and by families for the manufacture of butter or cheese, which said improvements are hereinafter more fully set forth.

Figure 1:
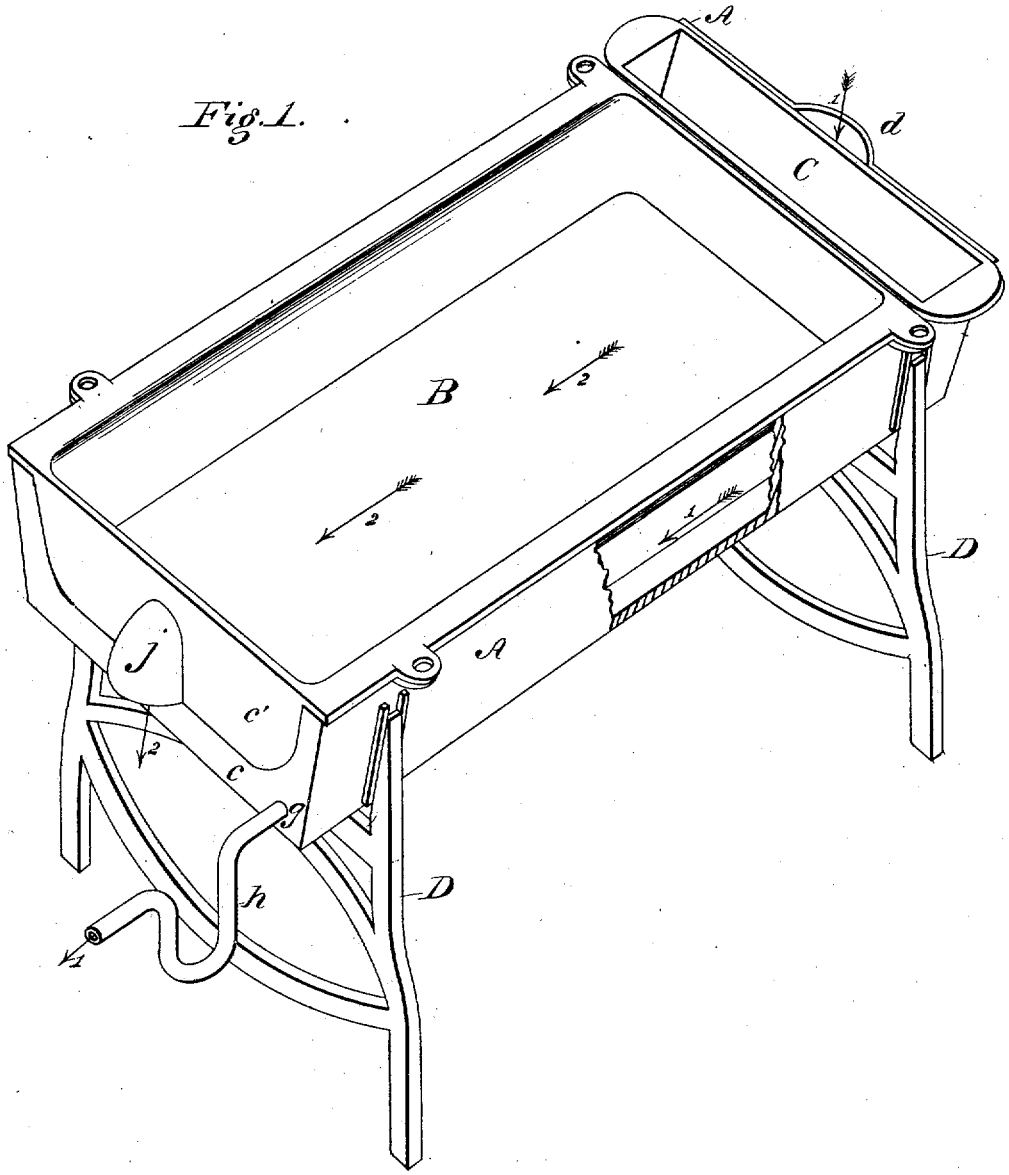
Figure 2:
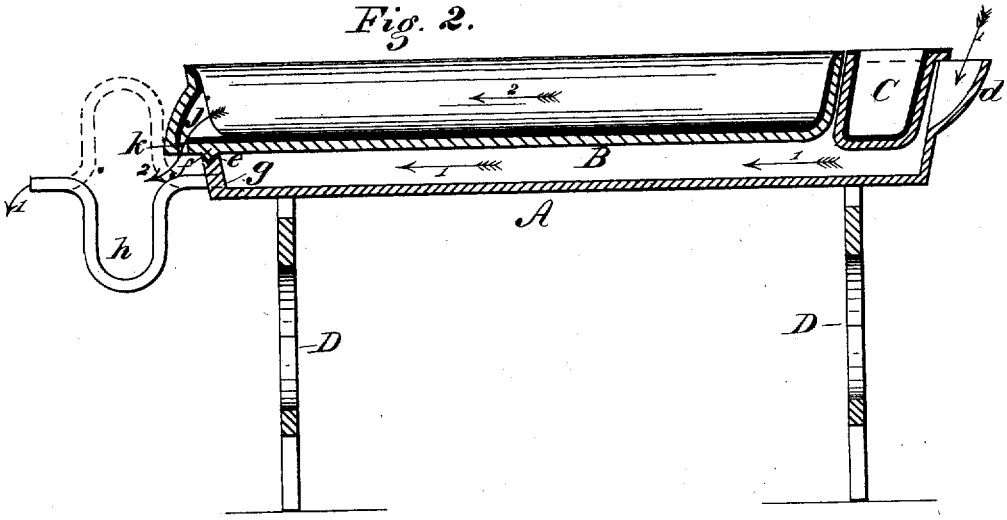

Figure 1 is a perspective view of my improved apparatus. Fig. 2 is a vertical longitudinal section; and Fig. 3 a transverse vertical section of the same.

Heretofore these articles have been constructed of tin or other sheet metal, necessitating numerous seams and joints, in which the curd or other particles of the milk or cream would adhere with great tenacity, rendering it both troublesome and tedious to thoroughly clean the pan, which must be effectually done in order to produce a pure article, as it is well known that any particles left adhering in the seams, joints, or to other parts of the pan, vat, or frame will soon become putrescent, and impart to the milk and its products an injurious taint or flavor, thereby greatly deteriorating its quality, and also its value.

In order to prevent these sheet-metal pans and vats from rusting, they have to be, or are, usually painted on their surfaces which come in contact with the water, and as milk and its products, especially butter, is one of the most powerful absorbents known of flavors of all kinds, it is liable to be injuriously affected by the paint, especially when hot water is used in the tank, as it is in cold weather. The constant rubbing and scrubbing of these painted surfaces to keep them clean necessitates the repainting of the same at intervals, and thus the flavor of the paint is liable to be imparted to the milk or cream, and also to the butter, if any be in the factory. These pans are also necessarily made of a large size, some holding not less than sixty gallons, and when made of sheet metal, it is difficult to prevent them from sagging and getting out of shape, a frame often being necessary on that account.

Figure 3:
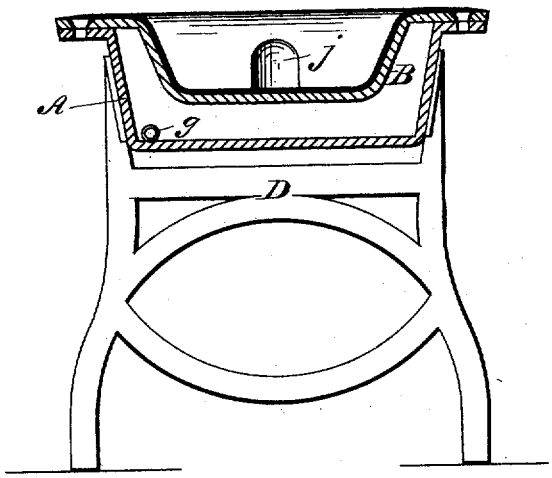

To remedy these and other objections is the object of my invention; and to that end I make my improved apparatus as follows:

In the drawings, B indicates the pan for containing the milk, and A the vat within which the pan is fitted, the space between being generally filled with water. Both the pan and the vat I make of cast-iron, each in a single piece, without seams or joints of any kind. As shown in the drawings, both are made with a lateral flange or rim, with holes for bolts, by which they can be firmly united when desired, the pan being both shallower and narrower in its body than the vat, whereby a water-space is left between them at the sides as well as at the bottom, as shown in Figs. 2 and 3. The vat is formed with grooves on its sides for the reception of the upper ends of legs or frames D, one of which is placed at each end, as shown in Figs. 1 and 2, and which support the whole apparatus, thus doing away with the wooden frame ordinarily used.

By thus making the vat and pan of cast-iron, and in a single piece each, they are rendered sufficiently stiff and strong to keep their shape perfectly even when filled, thus preventing their sagging, or requiring any other frame than merely the legs D. At the same time I avoid the joints and seams so objectionable in those made of sheet metal, thereby enabling both pan and vat to be much more easily cleaned, and much more certain to be kept pure and free from any adhering particles of milk or cream, and, of course, proportionably lessening the liability of injury to the contents of the pan and of the factory surrounding the same.

In order to prevent the contents of the pan from being injured either in its color or taste, by contact with the iron of the pan, I coat the inner or upper surface of the same with enamel, which is prepared and applied in a manner well known to those skilled in the art. This enamel should cover the flange, and all parts with which the milk is liable to come in contact, it serving also to protect the iron from the effects of the acids contained in the milk or cream when sour. Without the enamel it would not be possible to use the iron pan for this purpose, and therefore without it all the other advantages resulting from making it of iron would be lost.

Ordinarily the discharge-pipe from the pan has been made to pass through the bottom or side of the vat, necessitating the use of a surrounding tube, and the packing of the joints thereof, which, being between the pan and vat, were difficult to get at or keep tight.

In constructing my apparatus I make the discharge end *c'* of the pan to come out even with and rest upon the end *c* of the vat, as shown in Fig. 1, the upper edge of this end *c* being provided with a V-shaped groove, *e*, as shown in Fig. 2, the pan being provided with a correspondingly-shaped rib or projection, *f*, which fits in said groove, this joint being rendered water-tight by any suitable packing material. At the center of the end *c'* of the pan I make a projection, *j*, which has a hole, *k*, in its bottom, through which the contents of the pan can be discharged directly outside of the vat.

By making the pan shorter than the vat room is left at the end for a box or smaller pan, C, for holding either cream or ice, as shown in Figs. 1 and 2, it being enameled the same as the pan. At the receiving end of the vat a concave projection is formed, as shown in Figs. 1 and 2, to allow the water to enter, and at its opposite end there is made a hole, *g*, into which is screwed or otherwise fastened a bent pipe, *h*, as shown in Figs. 1 and 2, through which the water can be discharged from the vat at will. By turning this pipe so that its bend shall be raised more or less the height of the water in the vat can be regulated accordingly; or, by turning the bend uppermost, as shown by the dotted lines in Fig. 2, the vat will be kept full of water up to the rim of the pan. The arrows 1 show the course of the water in the vat, while the arrows 2 show the course of the milk when the pan is emptied.

By constructing the apparatus in the manner and of the material as above described, I am enabled to produce a milk-cooler far superior to any heretofore made, it being free from seams, joints, or crevices of any kind in which the material can lodge and be retained, and which, presenting a smooth surface, can be kept clean and sweet, with much less labor and trouble. Another advantage is that it is sufficiently rigid and strong to retain its shape, prevent sagging, and enabling me to dispense entirely with the wooden frames heretofore used, and which are liable to become more or less soiled and filthy, and requiring constant care and labor to prevent the milk, cream, or butter from being tainted or injured thereby. There is but a single joint to pack, and that is where it is readily accessible, while the bent pipe *h* affords the simplest and most efficient of means for regulating the height of the water in the vat and discharging the same therefrom.

The separate vessel C is very convenient for holding the cream separate from the milk, and enabling both to be cooled at the same time and by a single vat. It also affords a means of using ice for cooling the water when desired by placing the ice therein, and thus keeping it from direct contact with the water, the metal of the vessel C being a good conductor, and therefore acting readily as a medium of transfer between the ice and water.

I am aware that the enamel coating has heretofore been applied to culinary vessels and various other articles, and I do not claim the enameling of vessels or articles as my invention; but I am not aware that a milk-cooler has ever before been made of metal sufficiently rigid to keep its shape and be supported without a frame, or that such an apparatus has ever before been made with an enameled pan or vessel for containing the milk or cream.

What I claim as my invention is—

1. The milk-pan B, made of cast iron, enameled upon its inner surface, so constructed as to adapt it to be used in connection with a water-vat, A, substantially as and for the purpose set forth.

2. The combination of the enameled pan B and the cast-iron vat A, constructed and adapted for use substantially as described, whereby all wood-work is dispensed with, and both pan and vat are provided throughout with smooth interior surfaces free from the joints and seams incident to the use of sheet metal for such purposes, as set forth.

3. The milk pan and vat combined, the discharging end of the pan forming a part of the end of the vat, and having its discharge-passage projecting outside of the vat, substantially as described.

4. The combination of the water-vat A, milk-pan B, and cream or ice vessel C, all constructed to operate substantially as described.

5. The vat A, provided with the bent pipe *h*, arranged to operate as set forth.

WM. H. JOHNSON.

Witnesses:
W. G. EDGERTON,
W. H. GRISWOLD.